United States Patent
O'Keeffe et al.

(10) Patent No.: US 8,384,467 B1
(45) Date of Patent: Feb. 26, 2013

(54) RECONFIGURABLE CHARGE PUMP

(75) Inventors: Daniel O'Keeffe, Whitechurch (IE); Kevin Gallagher, Midleton (IE); Denis Ellis, Patrickswell (IE); Hans W. Klein, Pleasanton, CA (US)

(73) Assignee: Cypress Semiconductor Corporation, San Jose, CA (US)

( * ) Notice: Subject to any disclaimer, the term of this patent is extended or adjusted under 35 U.S.C. 154(b) by 0 days.

(21) Appl. No.: 13/534,299

(22) Filed: Jun. 27, 2012

Related U.S. Application Data

(60) Provisional application No. 61/614,432, filed on Mar. 22, 2012.

(51) Int. Cl.
 G05F 1/10 (2006.01)
 G05F 3/02 (2006.01)

(52) U.S. Cl. .......... 327/536; 327/535; 327/537; 363/60

(58) Field of Classification Search .................. 327/148, 327/157, 534–537; 363/59, 60
See application file for complete search history.

(56) References Cited

U.S. PATENT DOCUMENTS

| | | | | |
|---|---|---|---|---|
| 5,767,735 A * | 6/1998 | Javanifard et al. | ............ | 327/536 |
| 5,969,961 A * | 10/1999 | Yero | ............ | 363/60 |
| 6,064,250 A | 5/2000 | Proebsting | | |
| 6,151,229 A | 11/2000 | Taub | | |
| 6,310,789 B1 | 10/2001 | Nebrigic | | |
| 6,369,642 B1 | 4/2002 | Zeng | | |
| 6,472,926 B2 * | 10/2002 | Taito et al. | ............ | 327/536 |
| 7,511,564 B2 * | 3/2009 | Tahata | ............ | 327/536 |
| 7,626,444 B2 | 12/2009 | Clewett | | |
| 7,696,812 B2 * | 4/2010 | Al-Shamma et al. | ......... | 327/536 |
| 7,969,235 B2 | 6/2011 | Pan | | |
| 8,072,256 B2 * | 12/2011 | Pyeon | ............ | 327/536 |
| 2006/0250177 A1 * | 11/2006 | Thorp et al. | ............ | 327/536 |
| 2010/0117612 A1 | 5/2010 | Klootwijk | | |
| 2010/0244858 A1 | 9/2010 | Cormier | | |
| 2011/0133820 A1 | 6/2011 | Pan | | |
| 2011/0278952 A1 | 11/2011 | Reimann | | |

OTHER PUBLICATIONS

Zhang, Xiwen; An Efficiency-enhanced auto-reconfigurable 2x/3x SC charge pump for transcutaneous power transmission; Sep. 13-16, 2009; IEEE Xplore; http://ieeexplore.ieee.org/xpl/articleDetails.jsp?reload=true&tp=&arnumber=5280827&contentType=Conference+Publications&queryText%3D10.1109%2FCICC.2009.5280827; 1 Page.

Leung, Ka Nang et al.; A Gain Optimising Regulated Charge Pump; Ingentaconnect; International Journal of Electronics; Vol. 98, No. 2, Feb. 2011; http://www.ingentaconnect.com/content/tandf/tetn/2011/00000098/00000002/art00005; 1 Page.

Palumbo, Gaetano et al.; Charge Pump Circuits: An Overview on Design Strategies and Topologies; IEEE Circuits and Systems Magazine; First Quarter 2010; pp. 32-51.

Woo, Jong-Kwan et al.; A Fast-Locking CDR Circuit with an Autonomously Reconfigurable Charge Pump and Loop Filter; Nov. 13-15, 2006; IEEE Xplore; http://ieeexplore.ieee.org/xpl/login.jsp?tp=&arnumber=4197677&url=http%3A%2F%2Fieeexplore.ieee.org%2Fxpls%2Fabs_all.jsp%3Farnumber%3D4197677; 1 Page.

(Continued)

*Primary Examiner* — Lincoln Donovan
*Assistant Examiner* — Brandon S Cole

(57) ABSTRACT

An apparatus includes a charge pump array including multiple charge pump cells. The charge pump array is configurable into a first arrangement of the charge pump cells coupled in series or a second arrangement of the charge pump cells coupled in parallel. The apparatus can include reconfiguration circuitry configured to select the first arrangement of the charge pump cells or the second arrangement of the charge pump cells. The charge pump array is configured to alter a voltage level of a signal based, at least in part, on the selected arrangement of the charge pump cells.

17 Claims, 6 Drawing Sheets

OTHER PUBLICATIONS

Starzyk, J.A.; A DC-DC Charge Pump Design Based on Voltage Doublers; Mar. 2001; IEEE Xplore; http://ieeexplore.ieee.org/xpl/login.jsp?tp=&arnumber=915390&url=http%3A%2F%2Fieeexplore.ieee.org%2Fxpls%2Fabs_all.jsp%3Farnumber%3D915390; 1 Page.

Wang, Chi-Chang; Efficiency Improvement in Charge Pump Circuits; Jun. 1997; IEEE Xplore; http://ieeexplore.ieee.org/xpl/login.jsp?tp=&arnumber=585287&url=http%3A%2F%2Fieeexplore.ieee.org%2Fxpls%2Fabs_all.jsp%3Farnumber%3D585287; 1 Page.

Feng, Su; Component-Efficient Multiphase Switched-Capacitor DC-DC Converter with Configurable Conversion Ratios for LCD Driver Applications; IEEE Xplore; http://ieeexplore.ieee.org/xpl/articleDetails.jsp?tp=&arnumber=4569877&contentType=Journals+%26+Magazines&queryText%3D10.1109%2FTCSII.2008.922467; 1 Page.

* cited by examiner

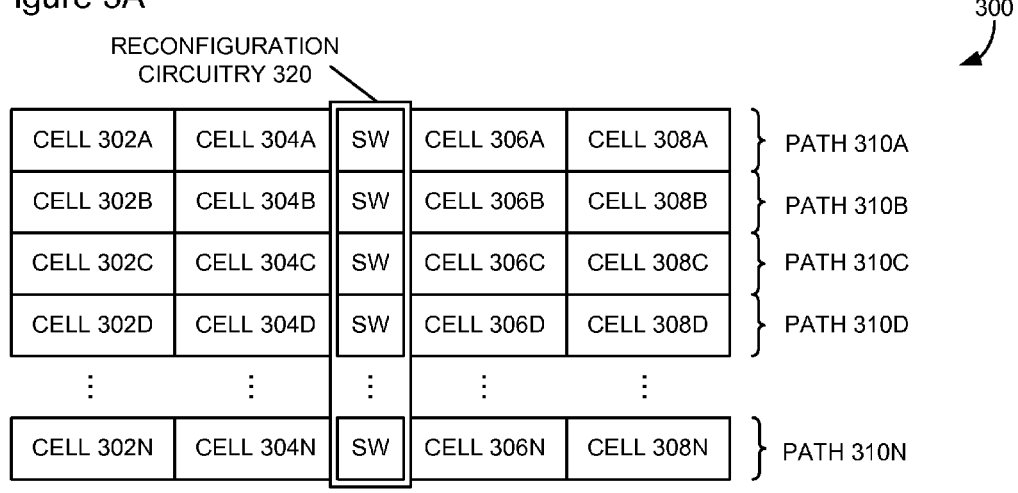
Figure 3A — FOUR STAGE CONFIGURATION
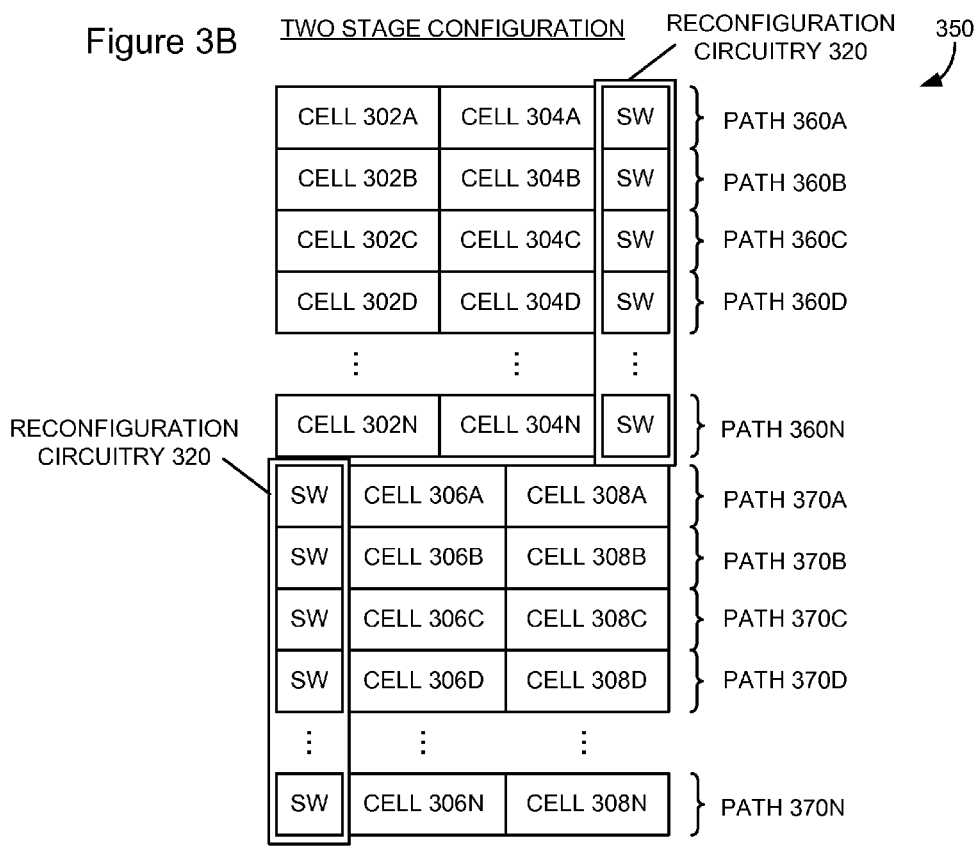
Figure 3B — TWO STAGE CONFIGURATION

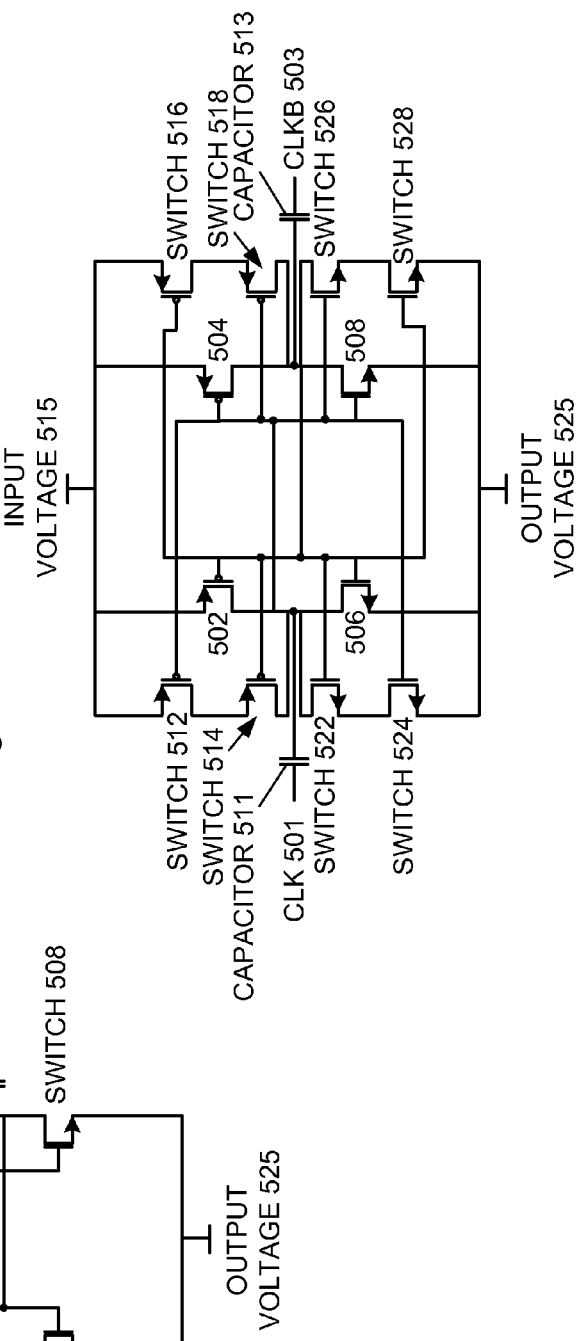
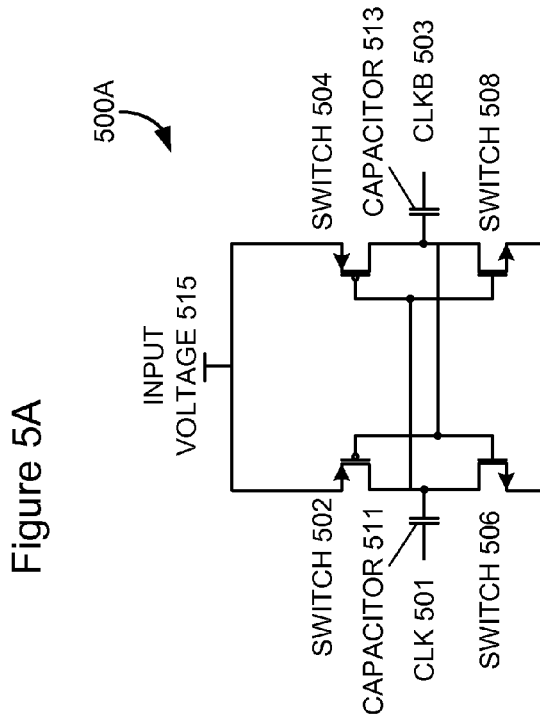
Figure 5B
Figure 5A

RECONFIGURABLE CHARGE PUMP

RELATED APPLICATION

This application claims priority to U.S. Provisional Patent Application No. 61/614,432, filed Mar. 22, 2012, which is incorporated herein by reference.

TECHNICAL FIELD

This disclosure relates generally to electronic systems, and, more particularly, to reconfigurable charge pumps.

BACKGROUND

Many systems can receive an input supply voltage from a power supply, for example, to power electronic circuits or devices in the systems. Since some of these systems can include electronic circuits or devices, such as touch screen displays, which perform operations in response to signals with a voltage level that differs from that of the input supply voltage, the systems can include charge pumps or other voltage altering device to boost or lower the voltage level of the input supply voltage.

Charge pumps typically alter an input supply voltage by an integer multiple of the voltage level of the input supply voltage. The charge pumps can operate efficiently when configured to receive a specific input supply voltage and output a specific output signal. Any change in the input supply voltage provided to the charge pumps or in a desired output signal can cause the charge pumps to perform inefficiently with a high output impedance, which can alter the voltage and current levels of the output signal. Thus, developers of electronic devices that include charge pumps either tailor a design of the charge pumps to a specific customer system or provide a charge pump with a universal design that may operate inefficiently in the customer system.

DESCRIPTION OF THE DRAWINGS

FIGS. 3A and 3B are block diagrams illustrating example configurations of the reconfigurable charge pump.

FIGS. 5A and 5B are block diagrams illustrating examples a charge pump cell of the reconfigurable charge pump.

DETAILED DESCRIPTION

An electronic system can include a reconfigurable charge pump having an array of charge pump cells. The electronic system also can include reconfiguration circuitry that can select an arrangement of the charge pump cells in the array. The reconfigurable charge pump can boost a voltage level of an input signal based, at least in part, on the arrangement of the charge pump cells. Embodiments are shown and described below in greater detail.

Figure 1:
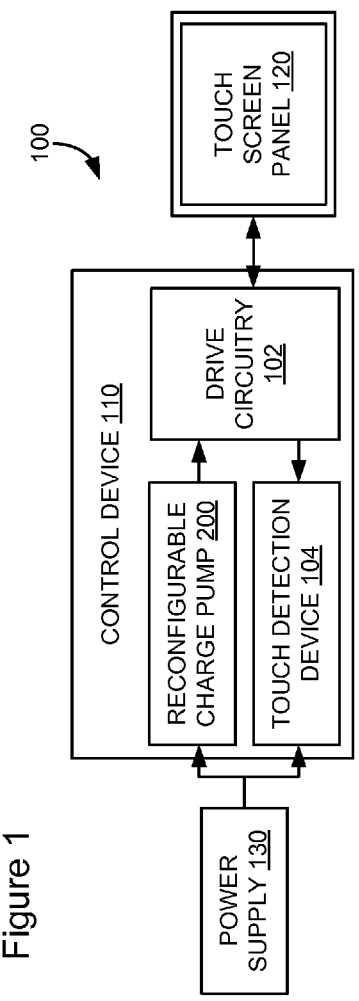
FIG. 1 is a block diagram example of a touch screen interface system including a reconfigurable charge pump.

FIG. 1 is a block diagram example of a touch screen interface system 100 including a reconfigurable charge pump 200. Referring to FIG. 1, the touch screen interface system 100 can include a control device 110 to control sensing operations associated with a touch screen panel 120. In some embodiments, the touch screen panel 120 can include sensor elements, for example, disposed as a two-dimensional matrix, to detect touches on a surface of the touch screen panel 120.

The control device 110 can include drive circuitry 102 to provide drive signals to the touch screen panel 120. The touch screen panel 120 can include capacitive sensor elements to receive the drive signals from the control device 110 and provide touch signaling back to the control device 110. The touch signaling can indicate to the control device 110 whether the surface of the touch screen panel 120 was touched. For example, when the touch screen panel 120 includes capacitive sensor elements, a touch of the surface of the touch screen panel 120 can alter a capacitance associated with the capacitive sensor elements associated with the touch. The drive signals can provide a voltage to one node of the capacitive sensor elements, while the other node corresponds to the touch signaling provided to the control device 110

The drive circuitry 102 can receive the touch signaling from the touch screen panel 120 and forward the touch signaling to a touch detection device 104 in the control device 110. The touch detection device 104 can analyze the touch signaling to determine whether a portion of the touch screen panel 120 had been touched, for example, by a user or an object.

The touch detection device 104 can measure the capacitance associated with the capacitive sensor elements from the touch signaling in various ways, such as current versus voltage phase shift measurement, resistor-capacitor charge timing, capacitive bridge divider, charge transfer, successive approximation, sigma-delta modulators, charge-accumulation circuits, field effect, mutual capacitance, frequency shift, or other capacitance measurement algorithms.

The control device 110 can include a reconfigurable charge pump 200 to receive an input voltage from a power supply 130, boost or otherwise alter a voltage level of the input voltage, and provide the boosted input voltage to the drive circuitry 102. The drive circuitry 102 can generate the drive signals from the boosted input voltage, for example, by performing level shifting operations to a drive voltage level. In some embodiments, the reconfigurable charge pump 200 can include multiple charge pump cells and reconfiguration circuitry that can control an arrangement of the charge pump cells. The arrangement of the charge pump cells in the reconfigurable charge pump 200 can control a voltage level and a magnitude of a current associated with the boosted input voltage. Embodiments of the reconfigurable charge pump 200 will be described below in greater detail. Although FIG. 1 shows the reconfigurable charge pump 200 as being included in a control device 110 to control sensing operations for the touch screen panel 120, in some embodiments, the reconfigurable charge pump 200 can be included in any device utilized to alter an input voltage.

Figure 2:
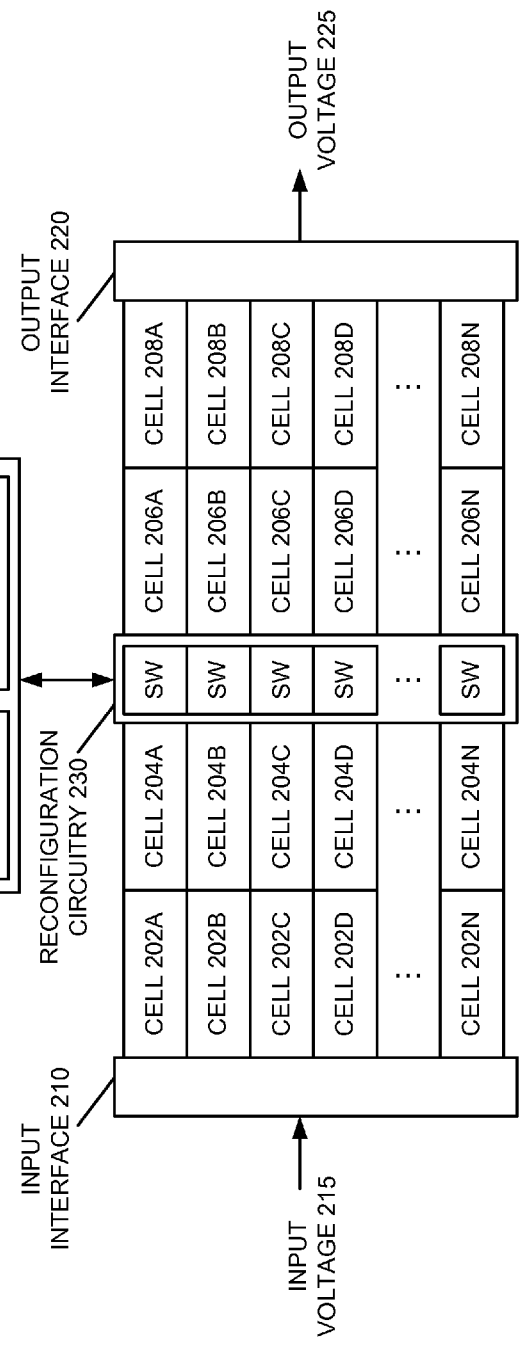
FIG. 2 is a block diagram example of a reconfigurable charge pump.

FIG. 2 is a block diagram example of a reconfigurable charge pump 200. Referring to FIG. 2, the reconfigurable charge pump 200 can include an input interface 210 to receive an input voltage 215, for example from a power supply, and include an array of charge pump cells 202A-202N, 204A-204N, 206A-206N, and 208A-208N, each of which can boost a voltage level of the input voltage 215. In some embodiments, each of the charge pump cells 202A-202N, 204A-204N, 206A-206N, and 208A-208N can boost the input voltage 215 by a magnitude approximately equal to the magnitude of the voltage level of the input voltage 215. The reconfigurable charge pump 200 can include an output interface 220 to output an output voltage 225 corresponding to the input voltage 215 as boosted by the array of charge pump cells 202A-202N, 204A-204N, 206A-206N, and 208A-208N.

The charge pump cells 202A-202N, 204A-204N, 206A-206N, and 208A-208N, when electrically coupled in series to form a voltage boosting path, can boost the input voltage 215 up to an integer multiple corresponding to the number of charge pump cells 202A-202N, 204A-204N, 206A-206N, and 208A-208N that are electrically coupled in series. For example, when four charge pump cells 202A, 204A, 206A, and 208A are coupled in series into a voltage boosting path, the four charge pump cells 202A, 204A, 206A, and 208A in the voltage boosting path can boost the voltage level of the input voltage 215 by approximately four times, and the reconfigurable charge pump 200 can output an output voltage 225 with an output interface 220 approximately five times the voltage level of the input voltage 215.

The voltage boosting path also can have an output impedance based on a number of charge pump cells 202A-202N, 204A-204N, 206A-206N, and 208A-208N electrically coupled in series. For example, when four charge pump cells 202A, 204A, 206A, and 208A are coupled in series into a voltage boosting path, the output impedance is approximately four times that of a single charge pump cell. Since a current corresponding to output signal 225 can be proportional to a magnitude of the output impedance, the reconfigurable charge pump 200 can be arranged or configured to have multiple voltage boosting paths electrically coupled in parallel to combine the outputs of the voltage boosting paths and reduce the magnitude of the output impedance. The output impedance of the reconfigurable charge pump 200 can be represented based on the equation:

$$\text{Total Output Impedance} = \frac{\text{Number of Cells per Path} * \text{Output Impedance of a Single Cell}}{\text{Number of Paths Coupled in Parellel}}$$

For example, when the reconfigurable charge pump 200 includes 10 parallel voltage boosting paths, each with four stages or charge pump cells, similar to the configuration shown and described below with reference to FIG. 3A, the output impedance corresponding to the reconfigurable charge pump 200 can be expressed as 0.4*R, where R is an output impedance corresponding to a single charge pump cell. When the reconfigurable charge pump 200 includes 20 parallel voltage boosting paths, each with two stages or charge pump cells, similar to the configuration shown and described below with reference to FIG. 3B, the output impedance corresponding to the reconfigurable charge pump 200 can be expressed as 0.1*R, where R is an output impedance corresponding to a single charge pump cell.

The reconfigurable charge pump 200 can include reconfiguration circuitry 230 to arrange, configure, and/or reconfigure the array of charge pump cells 202A-202N, 204A-204N, 206A-206N, and 208A-208N into various configurations. The reconfiguration circuitry 200 can include multiple switching devices SW that can selectively couple charge pump cells 202A-202N, 204A-204N, 206A-206N, and 208A-208N in series to form voltage boosting paths and selectively couple the voltage boosting paths in parallel. Embodiments of the reconfiguration circuitry 230 will be described below in greater detail.

The reconfigurable charge pump 200 can include control circuitry 240 to control the reconfiguration circuitry 230 and the arrangement of the array of charge pump cells 202A-202N, 204A-204N, 206A-206N, and 208A-208N. In some embodiments, the control circuitry 240 can include a down pump 212 and a level shifting device 214 to generate control signals for the switching devices SW in the reconfiguration circuitry 230. The level shifting device 214 can receive configuration signaling to indicate a configuration for the array of charge pump cells 202A-202N, 204A-204N, 206A-206N, and 208A-208N, for example, from a microcontroller or other control device, and generate or select appropriate control signals to provide to the reconfiguration circuitry 230. The down pump 212 can receive a voltage from the array of charge pump cells 202A-202N, 204A-204N, 206A-206N, and 208A-208N, for example, corresponding to a location of the switching devices SW in the array, and reduce the voltage level by a preset voltage magnitude. In some embodiments, the level shifting device 214 can select the reduced voltage level from the down pump 212 as at least a portion of the control signals provided to the reconfiguration circuitry 230.

FIGS. 3A and 3B are block diagrams illustrating example configurations of the reconfigurable charge pump 200. Referring to FIG. 3A, a four stage configuration 300 of the reconfigurable charge pump 200 is shown. The four stage configuration 300 can include voltage boosting paths 310A-310N with four charge pump cells 302-308 electrically coupled in series by reconfiguration circuitry 320 to boost a voltage level of an input voltage. Although FIG. 3A shows the reconfigurable charge pump 200 having multiple voltage boosting paths 310A-310N, in some embodiments, the reconfigurable charge pump 200 can have a single voltage boosting path.

Referring to FIG. 3B, a two stage configuration 350 of the reconfigurable charge pump 200 is shown. The reconfiguration circuitry 320 can configure the array of charge pump cells 302-308 into a two stage configuration 350, for example, having one or more voltage boosting paths with two charge pumps electrically coupled in series.

The two stage configuration 350 can include voltage boosting paths 360A-360N with two charge pump cells 302-304 electrically coupled in series by reconfiguration circuitry 320 to boost a voltage level of an input voltage. The two stage configuration 350 includes voltage boosting paths 370A-370N with two charge pump cells 306-308 electrically coupled in series by reconfiguration circuitry 320 to boost a voltage level of an input voltage. Although FIG. 3B shows the reconfigurable charge pump 200 having multiple voltage boosting paths 360A-360N and 370A-370N, in some embodiments, the reconfigurable charge pump 200 can have a single voltage boosting path.

In some embodiments, the four stage configuration and the two stage configuration can be selected based on the specifications of a system implementing the reconfigurable charge pump 200. For example, the reconfiguration circuitry 320 can be prompted to select between the four stage configuration and the two stage configuration based on the input voltage level received by the reconfigurable charge pump 200 or a voltage and/or current level of an output signal to be supplied by the reconfigurable charge pump 200.

Although FIGS. 3A and 3B show the reconfiguration circuitry 320 configuring the reconfigurable charge pump 200 in a 4-stage mode and a 2-stage mode, in some embodiments, the reconfiguration circuitry 320 can arrange the charge pump cells in any configuration with any number charge pump cells coupled in series and any number of charge pump cells coupled in parallel.

Figure 4A:
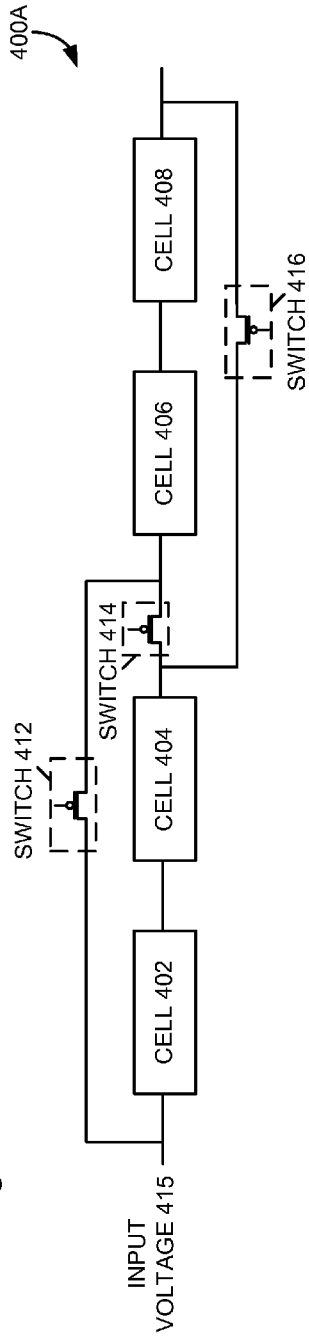
FIGS. 4A-4C are block diagrams illustrating examples of a portion of the reconfigurable charge pump.
Figure 4B:
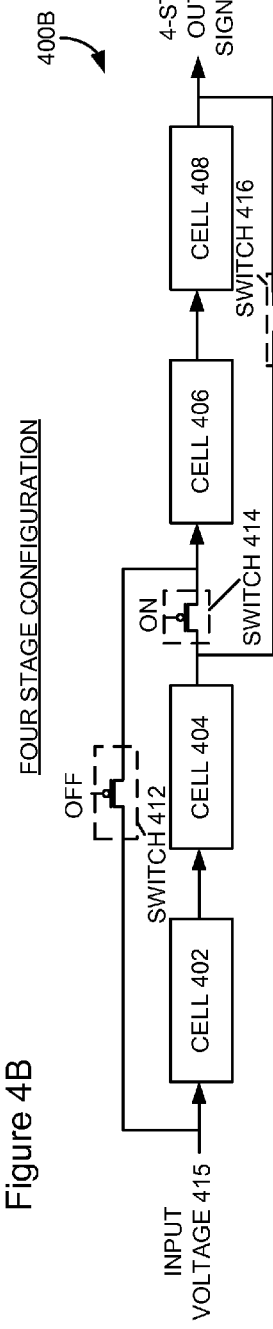
Figure 4C:
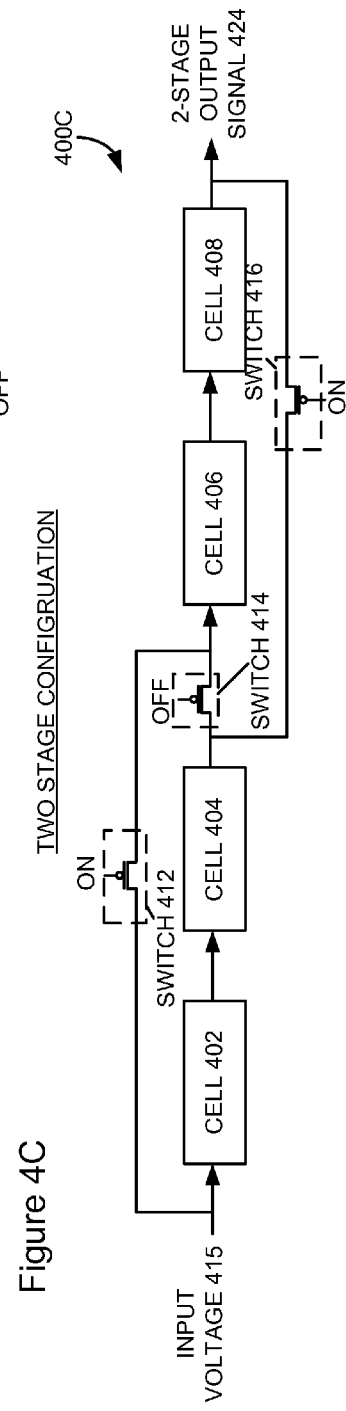

FIGS. 4A-4C are block diagrams illustrating examples of a portion of a reconfigurable charge pump. Referring to FIG. 4A, the reconfigurable charge pump 400 can include multiple charge pump cells 402-408, each configured to boost voltages they receive as inputs. The reconfigurable charge pump 400A can include switches 412, 414, and 416 that can configure the reconfigurable charge pump 400A, for example, by selectively routing input voltage to charge pump cell 406 and output voltages from charge pump cell 404. In some embodiments, the switches 412, 414, and 416 can be p-type metal-oxide-semiconductor (PMOS) transistors with gates coupled to receive control signals, for example, from control circuitry. Although FIG. 4A shows the switches 412, 414, and 416 as PMOS transistors, in other embodiments, the switches 412, 414, and 416 can be any switching device capable of reconfiguring the reconfigurable charge pump 400A.

Referring to FIG. 4B, the reconfigurable charge pump 400B can be configured by switches 412, 414, and 416 to implement a four stage configuration. The four stage configuration can have four charge pump cells 402-408 configured in series. The charge pump cell 402 can receive an input voltage 415, for example, from a power supply, boost the input voltage 415, and provide the boosted input voltage to the charge pump cell 404. The charge pump cell 404 can boost the voltage from the charge pump cell 402 and provide the boosted input voltage to the charge pump cell 406 through switch 414. The charge pump cell 406 can boost the voltage from the charge pump cell 404 and provide the boosted input voltage to the charge pump cell 408. The charge pump cell 408 can boost the voltage from the charge pump cell 406 and output the boosted input voltage as a 4-stage output signal 422.

The reconfigurable charge pump 400B can generate the 4-stage output signal 422 with a voltage level that can be approximately five times the voltage level of the input voltage—with each cell 402-408 increasing the voltage level by approximately the magnitude of the input voltage 415. The output impedance of the reconfigurable charge pump 400B can be approximately four times the impedance of a single cell, or 4*R, where R is an output impedance corresponding to a single charge pump cell.

Referring to FIG. 4C, the reconfigurable charge pump 400C can be configured by switches 412, 414, and 416 to implement a two stage configuration. The two stage configuration can have two charge pump cells 402 and 404 configured in series to form a first voltage boosting path, and can have two charge pump cells 406 and 408 configured in series to form a second voltage boosting path. The switches 412, 414, and 416 can configure the reconfigurable charge pump 400C to include the first voltage boosting path and the second voltage boosting path in parallel, which can reduce the output impedance of the reconfigurable charge pump array 400C.

The charge pump cell 402 can receive an input voltage 415, for example, from a power supply, boost the input voltage 415, and provide the boosted input voltage to the charge pump cell 404. The charge pump cell 404 can boost the voltage from the charge pump cell 402 and provide the boosted input voltage to an output of the reconfigurable charge pump array 400C via switch 416.

The charge pump cell 406 also can receive the input voltage 415, for example, from the power supply via switch 412, boost the input voltage 415, and provide the boosted input voltage to the charge pump cell 408. The charge pump cell 408 can boost the voltage from the charge pump cell 406. The reconfigurable charge pump 400C can combine the boosted voltages from the charge pump cell 404 via switch 416 and from cell 408 to generate a 2-stage output signal 424.

The reconfigurable charge pump 400C can generate the 2-stage output signal 424 with a voltage level that can be approximately three times the voltage level of the input voltage—with each charge pump cell 402-408 adding to the magnitude of the input voltage 415 up to the magnitude of the input voltage 415. The output impedance of the reconfigurable charge pump 400C can be approximately the impedance of a single cell, or R, where R is an output impedance corresponding to a single charge pump cell. In other words, the two stage configuration can provide a reduction in the output impedance that is four times smaller than the output impedance of the four stage configuration.

Although FIGS. 4A-4C show the switches 412, 414, and 416, reconfiguring charge pump cells 402-408 in a 4-stage mode and a 2-stage mode, in some embodiments, a reconfigurable charge pump can include additional switching to arrange the charge pump cells 402-408 in any configuration with any number charge pump cells coupled in series and any number of charge pump cells coupled in parallel.

FIGS. 5A and 5B are block diagrams illustrating examples of a charge pump cell of the reconfigurable charge pump. Referring to FIG. 5A, a charge pump cell 500A can include switches 502 and 504, for example, PMOS transistors, with their respective gates and drains tied to switches 506 and 508, for example, n-type metal-oxide-semiconductor (NMOS) transistors. The switches 502 and 504 can have their sources tied to an input voltage 515 and the switches 506 and 508 can have their sources tied to an output voltage 525.

The gates of switches 504 and 508 can be tied to drains of switches 502 and 506 and to a first node of a capacitor 511. A second node of the capacitor 511 can receive a clock signal CLK 501. The gates of switches 502 and 506 can be tied to drains of switches 504 and 508 and to a first node of a capacitor 513. A second node of the capacitor 513 can receive a clock signal CLKB 503.

Referring to FIG. 5B, a charge pump cell 500B can include the similar structure as charge pump cell 500A with switches 502, 504, 506, and 508 and capacitors 511 and 513, but also include additional switches 512, 514, 516, 518, 522, 524, 526, and 528. In some embodiments, the switches 512, 514, 516, and 518 can be p-type metal-oxide-semiconductor (PMOS) transistors, and switches 522, 524, 526, and 528 can be n-type metal-oxide-semiconductor (NMOS) transistors.

The switches 512 and 516 can have their sources coupled to input voltage 515. The switches 514 and 518 can have their sources coupled to the drains of switches 512 and 514, respectively. The switches 522 and 526 can have their drains coupled to the drains of switches 514 and 518, respectively. The switches 524 and 528 can have their drains coupled to the sources of switches 522 and 526, respectively. The switches 512, 518, 524, and 526 can have their gates coupled to the gates of transistors 504 and 508. The switches 514, 516, 522, and 528 can have their gates coupled to the gates of transistors 502 and 506.

Figure 6:
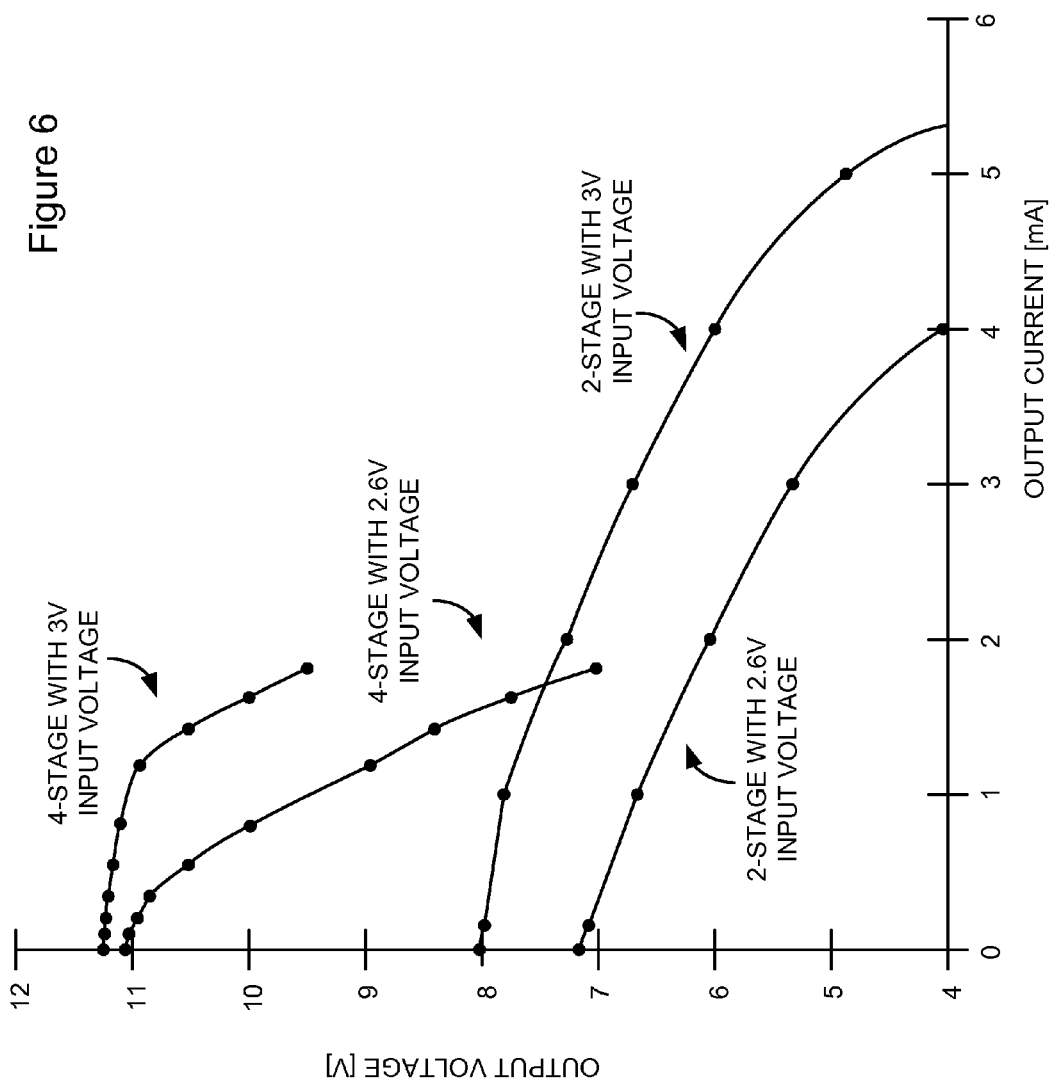
FIG. 6 is an example graph illustrating the operation of the reconfigurable charge pump in multiple operational modes.

FIG. 6 is an example graph illustrating the operation of a reconfigurable charge pump in multiple operational modes. Referring to FIG. 6, the graph includes a y-axis corresponding to output voltage and an x-axis corresponding to an output current of a reconfigurable charge pump. The graph includes four plots showing the operation of the reconfigurable charge pump operating in two different modes—a 4-stage mode and a 2-stage mode—with two different input voltages.

The plots of the reconfigurable charge pump operating in 4-stage mode with the 2.6V and 3V input voltages show that the charge pump boosted the voltage level of the input voltage, but that the output current remained relatively small due to the output impedance of the reconfigurable charge pump operating in the 4-stage mode. The plots of the reconfigurable charge pump operating in 2-stage mode with the 2.6V and 3V input voltages show that the charge pump boosted the voltage level of the input voltage lower than the 4-stage mode, but that the output current was increased relative to the 4-stage mode configuration due to a lower output impedance of the reconfigurable charge pump operating in the 2-stage mode.

In some embodiments, the reconfigurable charge pump can be implemented in a system, such as touch screen control circuitry, which can have a touch screen operating in response to a high output voltage to increase a signal-to-noise ratio (SNR) or in response to a high output current to more quickly drive a touch screen. In other words, increasing an output voltage to drive a touch screen can provide a higher quality sense signaling due to the increased signal-to-noise ratio caused by the increased output voltage, while an increase in output current can provide a quicker response to driving the touch screen.

Figure 7:
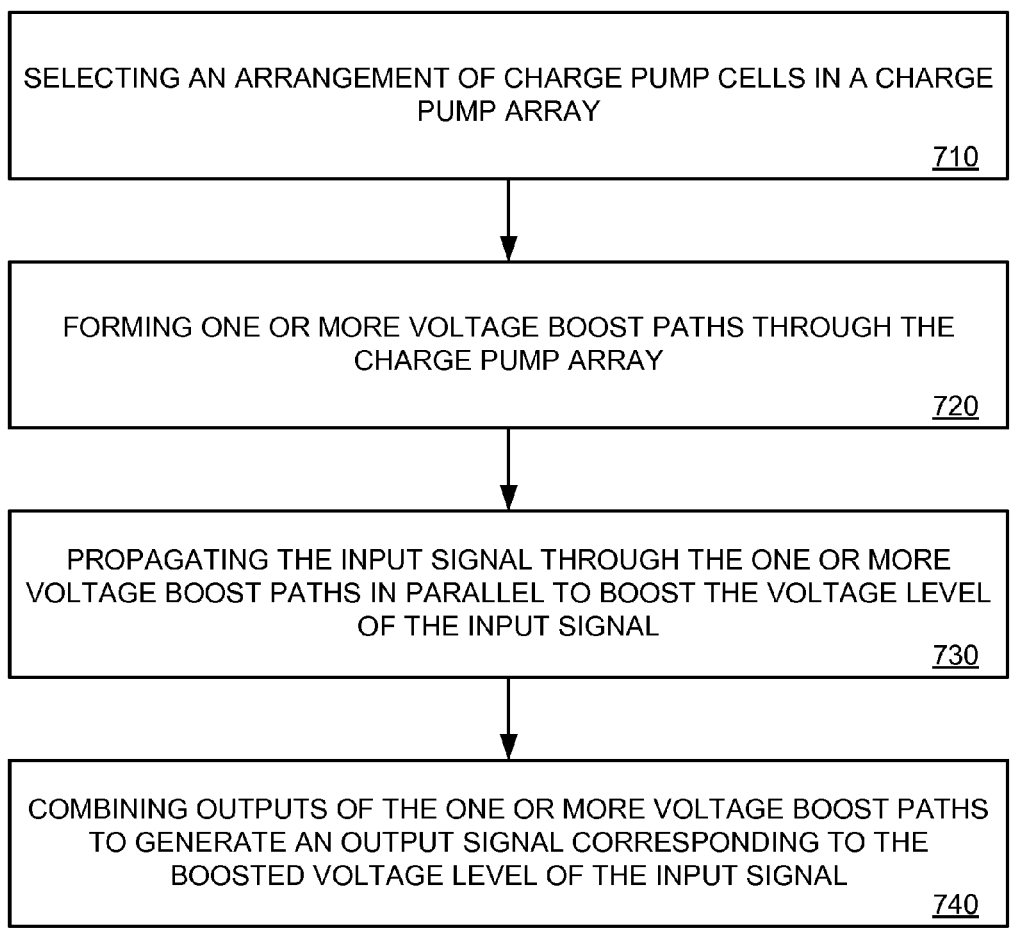
FIG. 7 is an example operational flowchart for the operation of the reconfigurable charge pump.

FIG. 7 is an example operational flowchart for the operation of the reconfigurable charge pump. Referring to FIG. 7, in a block 710, a reconfigurable charge pump can select an arrangement of charge pump cells in a charge pump array. In some embodiments, the selection of the arrangement of the charge pump cells in the charge pump array can identify a number of charge pump cells to be included in a voltage boost path, for example, a number of charge pump cells to couple in series. The number of charge pump cells to be included in a voltage boost path can alter a magnitude of the output voltage of an output signal of the reconfigurable charge pump.

The selection of the arrangement of the charge pump cells in the charge pump array also can identify a number of voltage boost paths in the reconfigurable charge pump. In some embodiments, the number of voltage boost paths can alter an output impedance of the reconfigurable charge pump, which can alter the output current of the output signal.

In a block 720, the reconfigurable charge pump can form one or more voltage boost paths through the charge pump array. In some embodiments, the reconfigurable charge pump can include reconfiguration circuitry to define the voltage boost paths, for example, select charge pump cells to couple in series to form the voltage boost paths. The reconfiguration circuitry also can couple multiple voltage boost paths in parallel based on the selected arrangement.

In a block 730, the reconfigurable charge pump can propagate the input signal through the voltage boost paths to boost the voltage level of the input signal. The boosted voltage level of the input signal can correspond to the number of charge pump cells that are coupled in series in the voltage boost paths.

In a block 740, the reconfigurable charge pump can combine outputs of the voltage boost paths to generate the output signal corresponding to the boosted voltage level of the input signal. The output signal also can have a magnitude of its current correspond to the configuration of the reconfigurable charge pump, for example, due to differences in the output impedance of the configurations.

The reconfigurable charge pump, in some examples, can be configured to have 2 different configurations, one with a 4-stage configuration and one with a 2-stage configuration. Since the 4-stage configuration has additional charge pump cells electrically coupled in series, the 4-stage configuration can have a greater output voltage than the 2-stage configuration. Since the 2-stage configuration can free up charge pump cells to create additional voltage boost paths in parallel, the 2-stage configuration can have a lower output impedance and higher output current than the 4-stage configuration.

The system and apparatus described above may use dedicated processor systems, micro controllers, programmable logic devices, microprocessors, or any combination thereof, to perform some or all of the operations described herein. Some of the operations described above may be implemented in software and other operations may be implemented in hardware. Any of the operations, processes, and/or methods described herein may be performed by an apparatus, a device, and/or a system substantially similar to those as described herein and with reference to the illustrated figures.

The processing device may execute instructions or "code" stored in memory. The memory may store data as well. The processing device may include, but may not be limited to, an analog processor, a digital processor, a microprocessor, a multi-core processor, a processor array, a network processor, or the like. The processing device may be part of an integrated control system or system manager, or may be provided as a portable electronic device configured to interface with a networked system either locally or remotely via wireless transmission.

The processor memory may be integrated together with the processing device, for example RAM or FLASH memory disposed within an integrated circuit microprocessor or the like. In other examples, the memory may comprise an independent device, such as an external disk drive, a storage array, a portable FLASH key fob, or the like. The memory and processing device may be operatively coupled together, or in communication with each other, for example by an I/O port, a network connection, or the like, and the processing device may read a file stored on the memory. Associated memory may be "read only" by design (ROM) by virtue of permission settings, or not. Other examples of memory may include, but may not be limited to, WORM, EPROM, EEPROM, FLASH, or the like, which may be implemented in solid state semiconductor devices. Other memories may comprise moving parts, such as a known rotating disk drive. All such memories may be "machine-readable" and may be readable by a processing device.

Operating instructions or commands may be implemented or embodied in tangible forms of stored computer software (also known as "computer program" or "code"). Programs, or code, may be stored in a digital memory and may be read by the processing device. "Computer-readable storage medium" (or alternatively, "machine-readable storage medium") may include all of the foregoing types of memory, as well as new technologies of the future, as long as the memory may be capable of storing digital information in the nature of a computer program or other data, at least temporarily, and as long at the stored information may be "read" by an appropriate processing device. The term "computer-readable" may not be limited to the historical usage of "computer" to imply a complete mainframe, mini-computer, desktop or even laptop computer. Rather, "computer-readable" may comprise storage medium that may be readable by a processor, a processing device, or any computing system. Such media may be any available media that may be locally and/or remotely accessible by a computer or a processor, and may include volatile and non-volatile media, and removable and non-removable media, or any combination thereof.

A program stored in a computer-readable storage medium may comprise a computer program product. For example, a storage medium may be used as a convenient means to store or transport a computer program. For the sake of convenience, the operations may be described as various interconnected or coupled functional blocks or diagrams. However, there may be cases where these functional blocks or diagrams may be equivalently aggregated into a single logic device, program or operation with unclear boundaries.

One of skill in the art will recognize that the concepts taught herein can be tailored to a particular application in many other ways. In particular, those skilled in the art will recognize that the illustrated examples are but one of many alternative implementations that will become apparent upon reading this disclosure.

Although the specification may refer to "an", "one", "another", or "some" example(s) in several locations, this does not necessarily mean that each such reference is to the same example(s), or that the feature only applies to a single example.

The invention claimed is:

1. An apparatus comprising:
   a charge pump array including multiple charge pump cells;
   control circuitry configured to generate control signals based on received configuration signaling, wherein the configuration signaling is configured to identify an arrangement of the charge pump cells that is based on a voltage level of a signal to be boosted by the charge pump array, and wherein the control circuitry comprises:
      a down pump configured to reduce a voltage level of a signal received from the charge pump array by a preset voltage magnitude,
      a level shifter configured to select the signal with the reduced voltage level as at least a portion of the control signals; and
   reconfiguration circuitry configured to select a first arrangement of the charge pump cells coupled in series or a second arrangement of the charge pump cells coupled in parallel in response to the control signals, wherein the charge pump array is configured to alter the voltage level of the signal based, at least in part, on the selected arrangement of the charge pump cells.

2. The apparatus of claim 1, wherein the reconfiguration circuitry is configured to selectively couple a number of the multiple charge pump cells in series to form a voltage boost path through the charge pump array, and wherein the charge pump array is configured to propagate the signal through the voltage boost path to boost the voltage level of the signal.

3. The apparatus of claim 1, wherein the reconfiguration circuitry is configured to selectively arrange the multiple charge pump cells to form multiple voltage boost paths through the charge pump array, each of the voltage boost paths including multiple charge pump cells arranged in series, and wherein the voltage boost paths are configured to boost the voltage level of the signal in parallel.

4. The apparatus of claim 3, wherein the reconfiguration circuitry is configured to combine outputs of the voltage boost paths to generate an output signal corresponding to the boosted voltage level of the signal.

5. The apparatus of claim 1, wherein the reconfiguration circuitry further comprises:
   a first switching device configured to selectively couple an output of a first charge pump cell to an input a second charge pump cell;
   a second switching device configured to selectively couple the output of the first charge pump cell to an output of the charge pump array; and
   a third switching device configured to selectively provide the signal to the input of the second charge pump cell.

6. The apparatus of claim 5, wherein the reconfiguration circuitry is configured to boost the signal through the first charge pump cell and the second charge pump cell in series in response to the first switching device coupling the output of the first charge pump cell to the input the second charge pump cell.

7. The apparatus of claim 5, wherein the reconfiguration circuitry is configured to boost the signal through the first charge pump cell in parallel with the second charge pump cell in response to the second switching device coupling the output of the first charge pump cell to the output of the charge pump array and the third switching device coupling the signal to the input of the second charge pump cell.

8. A method comprising:
   generating control signals from received configuration signaling, wherein the configuration signaling is configured to identify an arrangement of charge pump cells in a charge pump array that is based on a voltage level of a signal to be boosted by the charge pump array, and wherein generating control signals comprises:
      reducing a voltage level of a signal received from the charge pump array by a preset voltage magnitude, and
      selecting the signal with the reduced voltage level as at least a portion of the control signals;
   selecting a first arrangement of charge pump cells in a charge pump array from multiple different arrangements in response to the control signals; and
   boosting the voltage level of the signal based, at least in part, on the first arrangement of the charge pump cells.

9. The method of claim 8, further comprising:
   selecting a second arrangement of the charge pump cells in the charge pump array from the multiple different arrangements; and
   boosting the voltage level of the signal based, at least in part, on the second arrangement of the charge pump cells.

10. The method of claim 8, wherein selecting the first arrangement of the charge pump cells further comprising coupling a number of the multiple charge pump cells in series to form a voltage boost path through the charge pump array, and wherein boosting the voltage level of the signal further comprising propagating the signal through the voltage boost path to boost the voltage level of the signal.

11. The method of claim 10, wherein selecting the first arrangement of the charge pump cells further comprising arranging the multiple charge pump cells to form multiple voltage boost paths through the charge pump array, each of the voltage boost paths including multiple charge pump cells arranged in series, and wherein the voltage boost paths are configured to boost the voltage level of the signal in parallel.

12. The method of claim 11, wherein boosting the voltage level of the signal further comprising combining outputs of the voltage boost paths to generate an output signal corresponding to the boosted voltage level of the signal.

13. An apparatus comprising:
   a charge pump array including multiple charge pump cells;
   control circuitry configured to generate control signals based on received configuration signaling, wherein the configuration signaling is configured to identify an arrangement of the charge pump cells that is based on a voltage level of a signal to be boosted by the charge pump array, and wherein the control circuitry comprises:
      a down pump configured to reduce a voltage level of a signal received from the charge pump array by a preset voltage magnitude; and
      a level shifter configured to select the signal with the reduced voltage level as at least a portion of the control signals; and
   means for selecting a first arrangement of the charge pump cells coupled in series or a second arrangement of the charge pump cells coupled in parallel in response to the control signals, wherein the charge pump array is configured to alter the voltage level of the signal based, at least in part, on the selected arrangement of the charge pump cells.

14. The apparatus of claim 13, wherein the means for selecting is configured to selectively couple a number of the multiple charge pump cells in series to form a voltage boost path through the charge pump array, and wherein the charge pump array is configured to propagate the signal through the voltage boost path to boost the voltage level of the signal.

15. The apparatus of claim 13, wherein the means for selecting is configured to selectively arrange the multiple charge pump cells to form multiple voltage boost paths through the charge pump array, each of the voltage boost paths including multiple charge pump cells arranged in series, and wherein the voltage boost paths are configured to boost the voltage level of the signal in parallel.

16. The apparatus of claim 15, wherein the means for selecting is configured to combine outputs of the voltage boost paths to generate an output signal corresponding to the boosted voltage level of the signal.

17. The apparatus of claim 13, wherein an impedance associated with the charge pump array corresponds to a number of charge pump cells coupled in series in a voltage boost path and a number of voltage boost paths arranged in parallel that the charge pump array utilizes to boost the voltage level of the signal.

* * * * *